Oct. 2, 1923.
J. K. VANATTA
MOTOR CAR
Filed April 23, 1923
1,469,741
2 Sheets-Sheet 1
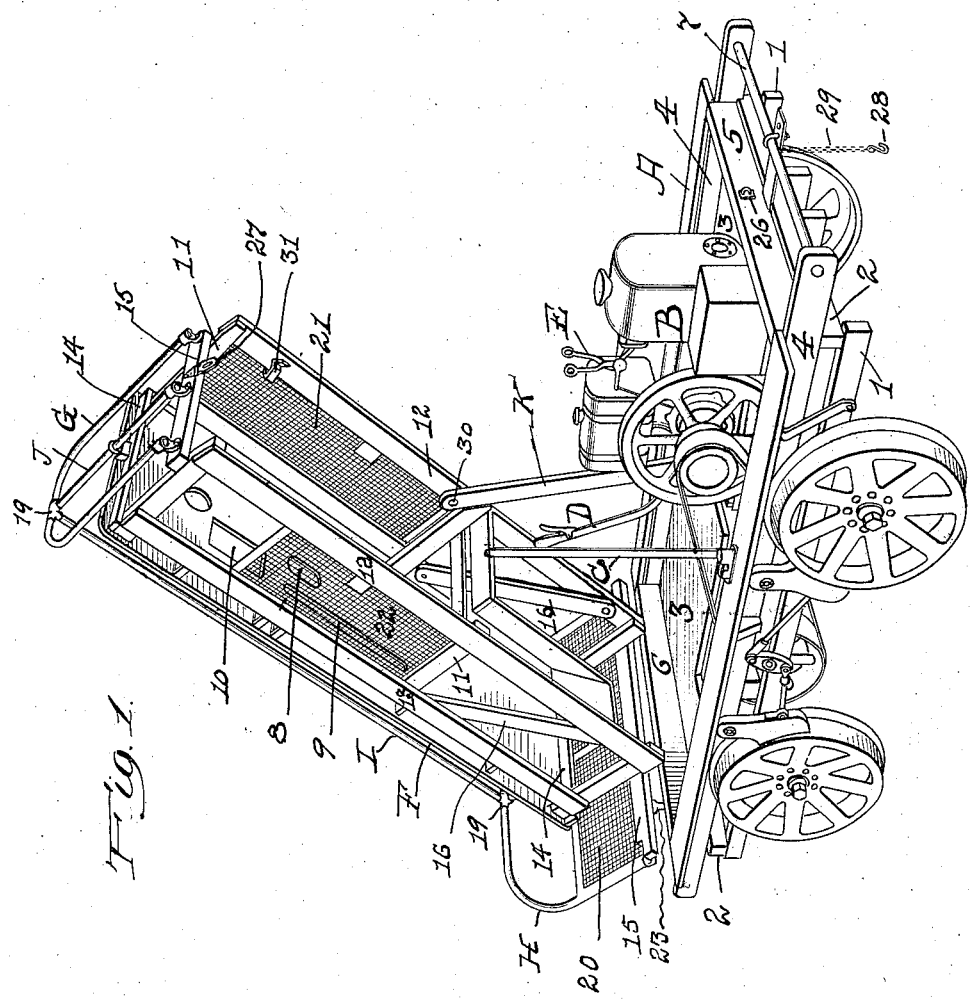

Oct. 2, 1923.
J. K. VANATTA
MOTOR CAR
Filed April 23, 1923
1,469,741
2 Sheets-Sheet 2
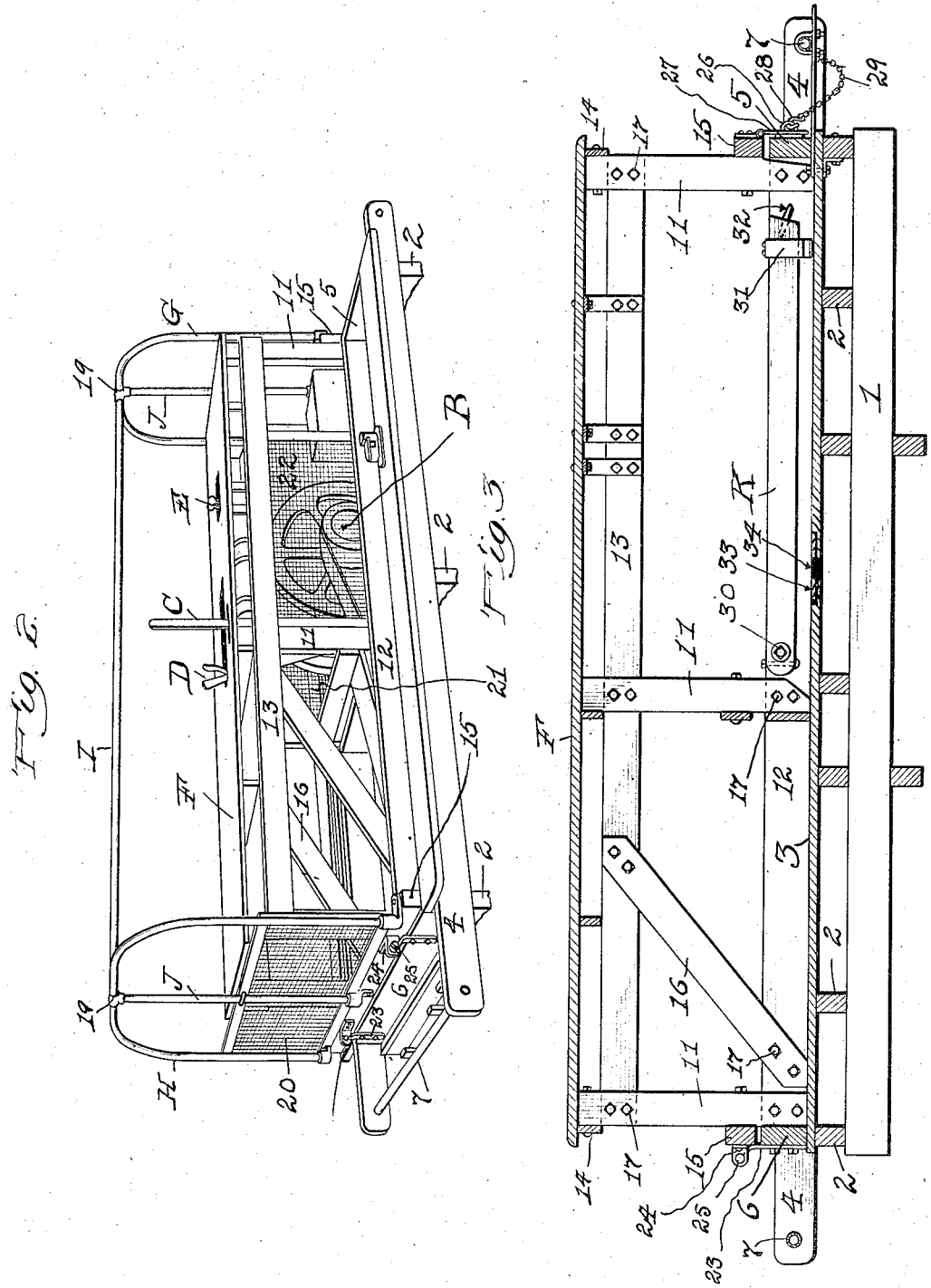

Patented Oct. 2, 1923.

1,469,741

UNITED STATES PATENT OFFICE.

JEAN K. VANATTA, OF CHICAGO, ILLINOIS, ASSIGNOR TO MUDGE & COMPANY, OF CHICAGO, ILLINOIS, A CORPORATION OF ILLINOIS.

MOTOR CAR.

Application filed April 23, 1923. Serial No. 633,818.

*To all whom it may concern:*

Be it known that I, JEAN K. VANATTA, a citizen of the United States, residing at Chicago, in the county of Cook and State of Illinois, have invented certain new and useful Improvements in Motor Cars, of which the following is a specification, reference being had to the accompanying drawings, and to the reference characters marked thereon, which form a part of this specification.

This invention relates to railway motor cars and more particularly to means for enabling the superstructure to be raised so that the power unit and other parts may be readily installed, inspected or repaired.

The invention consists in the devices and combinations of devices illustrated, described and claimed.

In the drawings:

Fig. 1 is a view, in perspective, of a motor car embodying my invention, the superstructure being raised.

Fig. 2 is a view, in perspective, of the opposite side of the motor car with the superstructure in normal position, the running gear being omitted.

Fig. 3 is a longitudinal, vertical, sectional view, on a different scale, of the platform frame and superstructure, in the normal position indicated in Fig. 2, the power unit and running gear being omitted.

In said drawings, A indicates the car frame comprising longitudinal beams 1, cross bars 2, a platform or floor 3, side bars 4, front and rear bars 5 and 6, the longitudinal side bars 4 extending beyond the front and the rear faces of the bars 5 and 6, and provided with rods 7.

Upon the car frame is the power unit indicated as a whole by B, and having its operating lever and control handles C, D and E extending upwardly and projecting through apertures 8, 9 and 10 in the raised seat F, as shown more clearly in Fig. 2.

The seat F is part of the superstructure comprising uprights or standards 11, side bars 12 and 13, transverse end bars 14 and 15, and brace or truss bars 16, all suitably secured together by bolts 17 or other convenient means. Secured to the front and rear lower cross bars 15, are the tubular metal guard rails G and H, which are joined together by a centrally positioned, longitudinal tubular rail member I. Strengthening posts J, J, extend from the lower cross bar 15 to the rail member I, and are connected at 19 to the upper cross bars 14. A wire screen 20 extends across the rear of the superstructure, and on the sides of the forward part of the latter are screen members 21, 22, to protect the adjacent power unit B.

The superstructure is secured at the rear of the car to the main frame by a pair of hinges, one member 23 of each hinge being bolted to the cross bar 6, the other member 24 being bolted to the lower cross bar 15 of the superstructure, and the two members 23 and 24 being united by a hinge or pintle pin 25.

The forward frame cross bar 5 has a staple 26 and the forward lower cross bar 15 has a hinged hasp 27 therefor. A hook 28 on one end of a cable 29 serves to lock the staple and hasp together, the other end of the cable 29 being secured to the rod 7 or to any other convenient member of the main frame.

When closed, in the normal position, as shown in Figs. 2 and 3, the superstructure is firmly set up on the main frame. It will be noted that the rear edges of the side bars 12 and the lower rear edges of the rear pair of uprights 11, rest firmly against the forward face of the rear cross bar 6. It will also be noted that the lower front edges of the front uprights 11 of the superstructure are slightly chamfered to clear the rear upper margin of the cross bar 5 when the superstructure is raised and lowered, but bear against said bar when in the lowered or normal position.

Upon the inside of one of the lower side bars 12 of the superstructure, I secure a movable brace bar or supporting standard K. The point of pivotal attachment by the bolt 30, or other convenient means, being about midway of the length of the side rail 12. The free end of the support K is cut away or beveled so that it will have a firm bearing upon the platform 3, when the superstructure F is in its raised position. A piece of flat spring metal 31 bent into a rectangular recessed form is secured at one end to the forward part of the adjacent side rail 12 and frictionally holds the free end of the support K in position when the superstructure is in the lowered or normal position.

Assuming the parts to be in the normal position as indicated by Fig. 2, to raise the superstructure F for the purpose of inspecting or repairing the power unit or other purpose, one first removes the hook 28, lifts the hasp 27, free from the staple 26, and then grasps the front end of the superstructure and raises it to the position shown in Fig. 1.

This is very easily accomplished as the superstructure turns readily upon its hinges. The support K is then freed from the friction holding member 31 and swung on its pivot 30 until its free end rests firmly upon the floor, with its projecting pin 32 engaging a suitable aperture in the floor.

In raising the superstructure, no bolts or fixed parts need be removed, the openings 8, 9 and 10 in the seat enabling the superstructure to free the handles of the brake, clutch and control, both in raising and lowering the seat. And, when restoring the superstructure to its normal position, one first raises it slightly with one hand and with the other swings the support K free from the floor, and into frictional engagement with the metal clip 31, lowers the superstructure into position and then locks it by the hasp 28. It will be readily comprehended from the foregoing, that the superstructure is very firmly united to the frame structure, when in the lowered or normal position, by reason of the intimate frictional contact of its supports 11 and side bars 12 with the frame cross bar 6, as well as by its hinges and the hasp lock, and that it may be thus used in hard service as efficiently as though it were bolted to the lower frame. It will also be manifest that to raise the superstructure will require but a moment of time, since no parts of the power plant or of the car have to be first unbolted or disconnected excepting the hasp and hook.

To afford a firm seat for the pin 32 and at the same time prevent it from wearing or enlarging the hole in the floor, I prefer to counter-sink a small metal plate 33 in the floor, said plate being provided with a suitable aperture 34 therethrough in which the pin 32 will be seated when the brace K is functioning to support the raised superstructure.

I claim as my invention:

1. A motor car having front and end cross bars and two side bars constituting a main frame, a superstructure frame supporting a seat, means for hingedly connecting the frame and one end of said superstructure, means for frictionally holding the superstructure and the frame firmly together when in the normal position, and means for holding the superstructure in an inclined position when one end thereof is raised above the frame.

2. A motor car having a main frame comprising side bars and front and rear cross bars, a movable superstructure provided with side and cross bars, the ends of the side bars of the superstructure extending below the cross bars and seated against the inside faces of the frame cross bars when the superstructure is in normal position, and a pair of hinges attached to adjacent cross bars of said frame and superstructure.

3. In a motor car having a main frame and a movable superstructure hingedly connected at one end to said frame, a power unit carried by the frame, a seat carried by the superstructure, and apertures through the seat through which the operating handles of the power unit may project when the seat is in normal position.

In testimony that I claim the foregoing as my invention, I affix my signature in the presence of two witnesses, this 11th day of April, 1923.

JEAN K. VANATTA.

Witnesses:
TAYLOR E. BROWN,
B. L. MACGREGOR.